US012026730B2

(12) United States Patent
Teo et al.

(10) Patent No.: US 12,026,730 B2
(45) Date of Patent: Jul. 2, 2024

(54) SYSTEM AND METHOD FOR INTERACTIVE TRANSACTION INFORMATION AGGREGATION

(71) Applicant: Capital One Services, LLC, McLean, VA (US)

(72) Inventors: Koon Heng Ivan Teo, San Francisco, CA (US); Yazdan Shirvany, Great Falls, VA (US); Joses Nthiga, Oakland, CA (US); Mohammad Shami, Foster City, CA (US); Francisco Perezleon, Richmond, CA (US); Fernando San Martin Jorquera, San Francisco, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/863,184

(22) Filed: Jul. 12, 2022

(65) Prior Publication Data
US 2022/0343348 A1 Oct. 27, 2022

Related U.S. Application Data

(63) Continuation of application No. 16/580,659, filed on Sep. 24, 2019, now Pat. No. 11,423,423.

(51) Int. Cl.
*G06Q 30/0201* (2023.01)
*G06F 16/9032* (2019.01)
(52) U.S. Cl.
CPC ..... *G06Q 30/0201* (2013.01); *G06F 16/9032* (2019.01)
(58) Field of Classification Search
CPC .......... G06Q 30/0201; G06F 16/9032
See application file for complete search history.

(56) References Cited

U.S. PATENT DOCUMENTS 7,475,030 B1 1/2009 Tenorio
7,813,976 B2 10/2010 Sick et al.
(Continued)

OTHER PUBLICATIONS

Image data mining of check transactions: Techniques and applications. Hassanein, Khaled. Journal of Information Technology Cases and Applications4.4: 4-21. Taylor & Francis Ltd. (2002).*

(Continued)

*Primary Examiner* — Timothy Padot
(74) *Attorney, Agent, or Firm* — HUNTON ANDREWS KURTH LLP (57) ABSTRACT

A transaction information aggregation system includes raw transaction and enriched transaction databases. The raw transaction database comprises transaction information for a plurality of transactions, including for each transaction an account holder identifier and at least one transaction parameter. The enriched transaction database comprises an indexed transaction record for each of the plurality of transactions, each record including a plurality of search terms associated with each of the at least one transaction parameter. A transaction information processing server is in data communication with the raw transaction and enriched transaction databases and is configured to receive raw transaction information for a new transaction, parse the raw transaction information to determine, associate search terms with a characteristic for each of the at least one transaction parameter, and establish a new indexed transaction record in the enriched transaction database for the new transaction, the new indexed transaction record including the additional searchable terms.

16 Claims, 6 Drawing Sheets

(56) References Cited

U.S. PATENT DOCUMENTS

| | | | |
|---|---|---|---|
| 8,290,951 B1* | 10/2012 | Joa | G06Q 40/02 707/754 |
| 8,620,895 B1 | 12/2013 | Lish et al. | |
| 9,582,555 B2 | 2/2017 | Kapadia et al. | |
| 9,600,536 B1 | 3/2017 | Atar et al. | |
| 10,445,152 B1 | 10/2019 | Zhang | |
| 2002/0116229 A1 | 8/2002 | Steuart et al. | |
| 2002/0138353 A1 | 9/2002 | Schreiber et al. | |
| 2003/0088562 A1* | 5/2003 | Dillon | G06F 16/30 707/999.005 |
| 2004/0030562 A1* | 2/2004 | Williams | H04W 16/18 705/325 |
| 2004/0088318 A1 | 5/2004 | Brady | |
| 2004/0172333 A1* | 9/2004 | Siviy | G06Q 20/20 705/16 |
| 2005/0203895 A1 | 9/2005 | Weild | |
| 2005/0278295 A1 | 12/2005 | Bernet et al. | |
| 2006/0074699 A1 | 4/2006 | Samsky et al. | |
| 2006/0243797 A1* | 11/2006 | Apte | G06Q 20/208 705/16 |
| 2009/0076949 A1* | 3/2009 | Olliphant | G06Q 40/12 705/39 |
| 2009/0100017 A1 | 4/2009 | Graves et al. | |
| 2009/0282006 A1 | 11/2009 | Misvaer et al. | |
| 2010/0228573 A1 | 9/2010 | Quinlan et al. | |
| 2012/0221577 A1* | 8/2012 | Fuh | G06F 16/22 707/E17.089 |
| 2013/0212455 A1 | 8/2013 | Titera et al. | |
| 2013/0311397 A1 | 11/2013 | Shah et al. | |
| 2013/0317869 A1 | 11/2013 | Tan et al. | |
| 2013/0325693 A1 | 12/2013 | Singson | |
| 2014/0136440 A1 | 5/2014 | Ahmed et al. | |
| 2014/0222559 A1* | 8/2014 | Caglayan | G06Q 30/0269 709/224 |
| 2014/0344297 A1* | 11/2014 | Jayade | G06Q 10/06316 707/755 |
| 2015/0052031 A1 | 2/2015 | Strausberg et al. | |
| 2015/0066584 A1 | 3/2015 | Granoff et al. | |
| 2016/0140576 A1 | 6/2016 | Roos et al. | |
| 2016/0196163 A1* | 7/2016 | van Gulik | G06F 16/212 718/102 |
| 2017/0069035 A1 | 3/2017 | Quinlan et al. | |
| 2017/0186095 A1 | 3/2017 | Muessler et al. | |

OTHER PUBLICATIONS

NICE Introduces Customer Engagement Analytics, the Industry's First Platform to Combine Interaction Analytics and Transaction Analytics: PR Newswire [New York] Apr. 22, 2013.*

* cited by examiner

SYSTEM AND METHOD FOR INTERACTIVE TRANSACTION INFORMATION AGGREGATION

CROSS REFERENCE TO RELATED APPLICATION

This application is a continuation of U.S. application Ser. No. 16/580,659, filed Sep. 24, 2019, the complete disclosure of which is incorporated herein by reference.

FIELD OF THE INVENTION

This disclosure relates generally to transaction information storage and control, and more specifically, to systems and methods for allowing account holders to obtain and analyze account transaction information in an interactive manner.

BACKGROUND OF THE INVENTION

Financial account holders often wish to review and assess various aspects of their account activity. This is typically done for budget planning purposes or to assure there have been no unauthorized charges. The tools available to account holders, however, have heretofore been limited to standard transaction criteria (e.g., spending categories such as transportation or entertainment) and preset time intervals (e.g., by year, by month, etc.) typically set by the transaction processor. Thus, if an account holder is interested in information on transactions meeting non-standard criteria (e.g., all transactions relating to a particular product or over a non-standard time interval), the provided tools were of no assistance. Accordingly, the value of these tools for assessing spending behavior and for budget planning is limited.

SUMMARY OF THE INVENTION

An illustrative aspect of the invention provides a transaction information aggregation system comprising a raw transaction database. The raw transaction database comprises transaction information for a plurality of transactions, the transaction information for each transaction including an account holder identifier and at least one transaction parameter. The system further comprises an enriched transaction database comprising an indexed transaction record for each of the plurality of transactions. The indexed transaction record includes a plurality of search terms associated with each of the at least one transaction parameter. The system still further comprises a transaction information processing server in data communication with the raw transaction and enriched transaction databases. The transaction information processing server is configured to receive raw transaction information for a new transaction from at least one of the set consisting of the raw transaction database, a merchant device, a transaction processor device, and an account holder device. The raw transaction information for the new transaction includes a characteristic for each of the at least one transaction parameter. The transaction information processing server is further configured to parse the raw transaction information to determine the characteristic for each of the at least one transaction parameter, to associate search terms with the characteristic for each of the at least one transaction parameter, and to establish a new indexed transaction record in the enriched transaction database for the new transaction. The new indexed transaction record includes the additional searchable terms.

Another aspect of the invention provides a method providing aggregated transaction information to an account holder. The method comprises establishing an enriched transaction database comprising an indexed transaction record for each of a plurality of transactions associated with an account of the account holder. The indexed transaction record includes at least one transaction parameter having a plurality of search terms associated therewith. The method further comprises, responsive to receiving raw transaction information for a new transaction including at least one transaction parameter, parsing, by a first automated data processing system, the raw transaction information to determine a characteristic for each of the at least one transaction parameter for the new transaction. The method still further comprises associating, by the first automated data processing system, search terms with each of the at least one transaction parameter based on the characteristic and establishing, by the first automated data processing system, a new indexed transaction record in the enriched transaction database for the new transaction. The new indexed transaction record includes the search terms. The method also comprises receiving, by a second automated data processing system, a request for aggregated transaction information from a user device associated with the account. The request includes aggregation criteria. The method also comprises obtaining, by the second automated data processing system, aggregated transaction information meeting the aggregation criteria from the enriched transaction database, and transmitting, by the second automated data processing system, the aggregated transaction information to the user device.

Another aspect of the invention provides a user data processing device comprising a data processor, a communication interface in communication with the data processor, a user interface, and a memory accessible by the data processor. The communication interface is configured for selective communication with at least one of a transaction processor, a raw transaction database, and a transaction information server via a network. The user interface comprises at least a user input device and a display. The memory contains a transaction information application with instructions to be carried out by the data processor. The transaction information application is configured to display to a user via the display, a plurality of transaction information aggregation request options including a natural language transaction search option. The application is further configured to, responsive to receiving from the user a selection of the natural language transaction search option, display a natural language search prompt and receive a natural language search query from the user via the user input device. The search query includes transaction aggregation criteria. The application is still further configured to transmit a request for aggregated transaction information to a query processing server. The request includes the aggregation criteria. The application is also configured receive aggregated transaction information from the query processing server, and to display the aggregated transaction information to the user via the display in a predetermined display format.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

The present invention provides systems and methods that provide users the ability to specify their own criteria for information on transactions involving their accounts. The invention involves the creation and continuous update of an enriched transaction database in which each account transaction is parsed by transaction characteristics. In this database, the various transaction characteristics are further associated with additional terminology, such that individual transactions and groups of transactions can be identified through natural language searching. Access to the enhanced transaction data base is provided to account holders via a user device application with a search processor mediating between the user device and the enriched transaction database.

Figure 1:
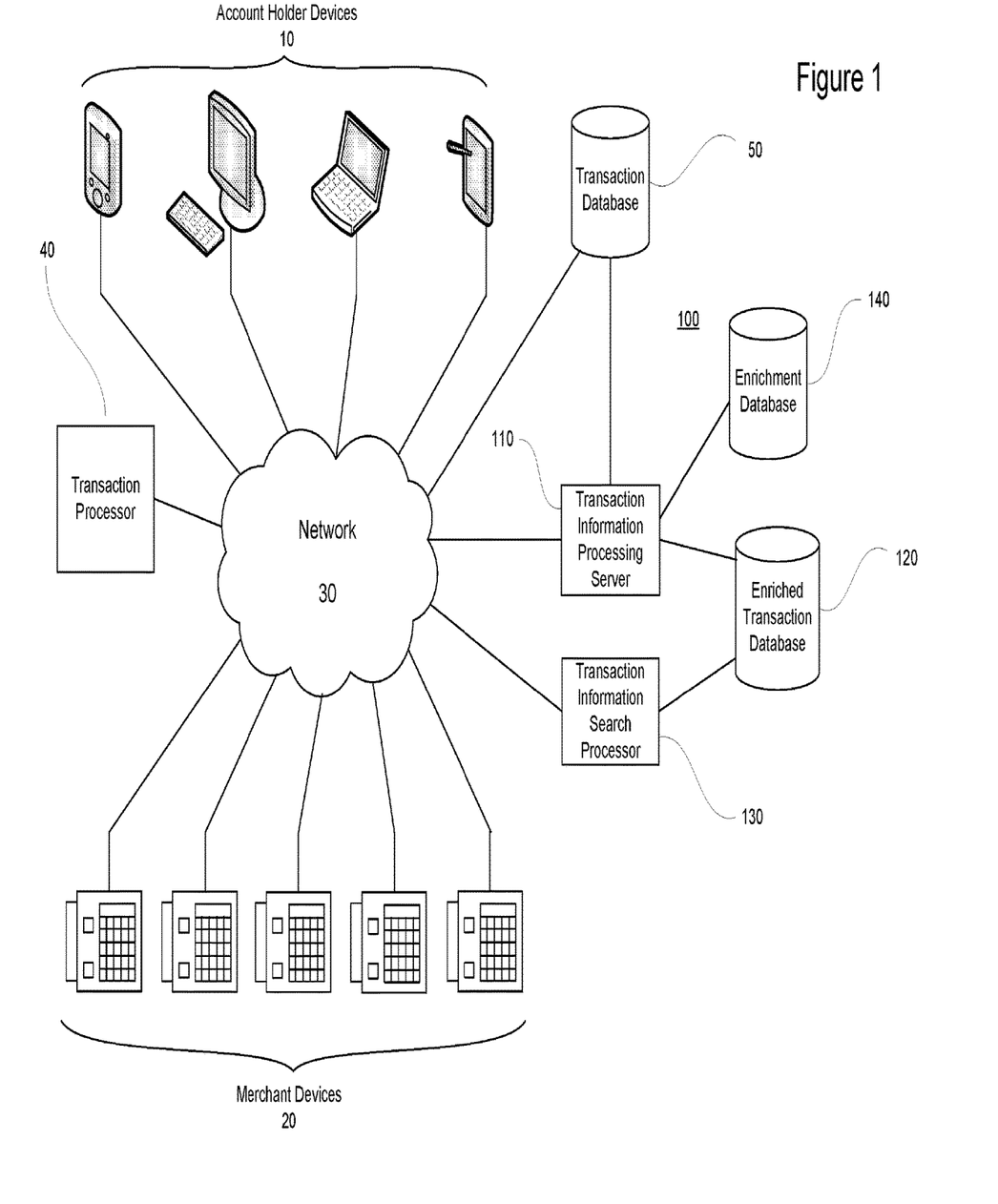
FIG. 1 is a schematic representation of a transaction information aggregation system according to an embodiment of the invention.

The methods of the invention can be implemented on or in conjunction with any transaction processing or monitoring system. FIG. 1 depicts a system 100 for monitoring transactions and for providing aggregated transaction information according to an embodiment of the invention. The system 100 may include various network-enabled computer systems, including, as depicted in FIG. 1 for example, a transaction information processing server 110, an enriched transaction database 120, and a transaction information search processor 130. The transaction information processing server 110 is in communication with a transaction database 50. The transaction information processing server 110 may also be in communication with a plurality of account holder processing devices 10, a plurality of merchant transaction processing devices 20, and/or a transaction processor 40 via network 30 from any of which the transaction modeling processor can receive transaction information. As shown in FIG. 1, communication between the transaction information processing server 110 and the transaction database 50 may also be via the network 30. Alternatively, the transaction information processing server 110 and the transaction database 50 may communicate by another local or wide area network. In some embodiments, the transaction processor 40, the transaction database 50 and the transaction monitoring system 100 may be connected by a network separate from the network 30.

As referred to herein, a network-enabled computer system and/or device may include, but is not limited to any computer device, or communications device including, a server, a network appliance, a personal computer (PC), a workstation, and a mobile processing device such as a smart phone, smart pad, handheld PC, or personal digital assistant (PDA). Mobile processing devices may include Near Field Communication (NFC) capabilities, which may allow for communication with other devices by touching them together or bringing them into close proximity.

The network-enabled computer systems used to carry out the transactions contemplated by the invention may execute one or more software applications to, for example, receive data as input from an entity accessing the network-enabled computer system, process received data, transmit data over a network, and receive data over a network. The one or more network-enabled computer systems may also include one or more software applications to notify an account holder based on transaction information. It will be understood that the depiction in FIG. 1 is an example only, and the functions and processes described herein may be performed by any number of network-enabled computers. It will also be understood that where the illustrated system 100 may have only a single instance of certain components, multiple instances of these components may be used. The system 100 may also include other devices not depicted in FIG. 1.

In the example embodiments presented herein, an account holder may be any individual or entity that desires to conduct a transaction (which may be, but is not limited to a financial transaction) with a merchant using a transaction account. An account may be held by any place, location, object, entity, or other mechanism for holding money or performing transactions in any form, including, without limitation, electronic form. An account may be, for example, a credit card account, a prepaid card account, stored value card account, debit card account, check card account, payroll card account, gift card account, prepaid credit card account, charge card account, checking account, rewards account, line of credit account, credit account, mobile device account, or mobile commerce account. The account holder may be a transaction processing entity such as a financial institution, credit card provider, or other entity that offers accounts to customers. An account may or may not have an associated card, such as, for example, a credit card for a credit account or a debit card for a debit account. The account card may be associated or affiliated with one or more social networking sites, such as a co-branded credit card.

A transaction account may be associated with a transaction card (e.g., a debit card, credit card, or prepaid account card. Alternatively or in addition, the transaction account may be associated with an account holder processing device or simply associated with a unique identifier enterable by the account holder to facilitate a transaction. The processing device may be configured to act as a method of payment at a POS location using, for example, NFC or any other mobile payment technology.

Figure 2:
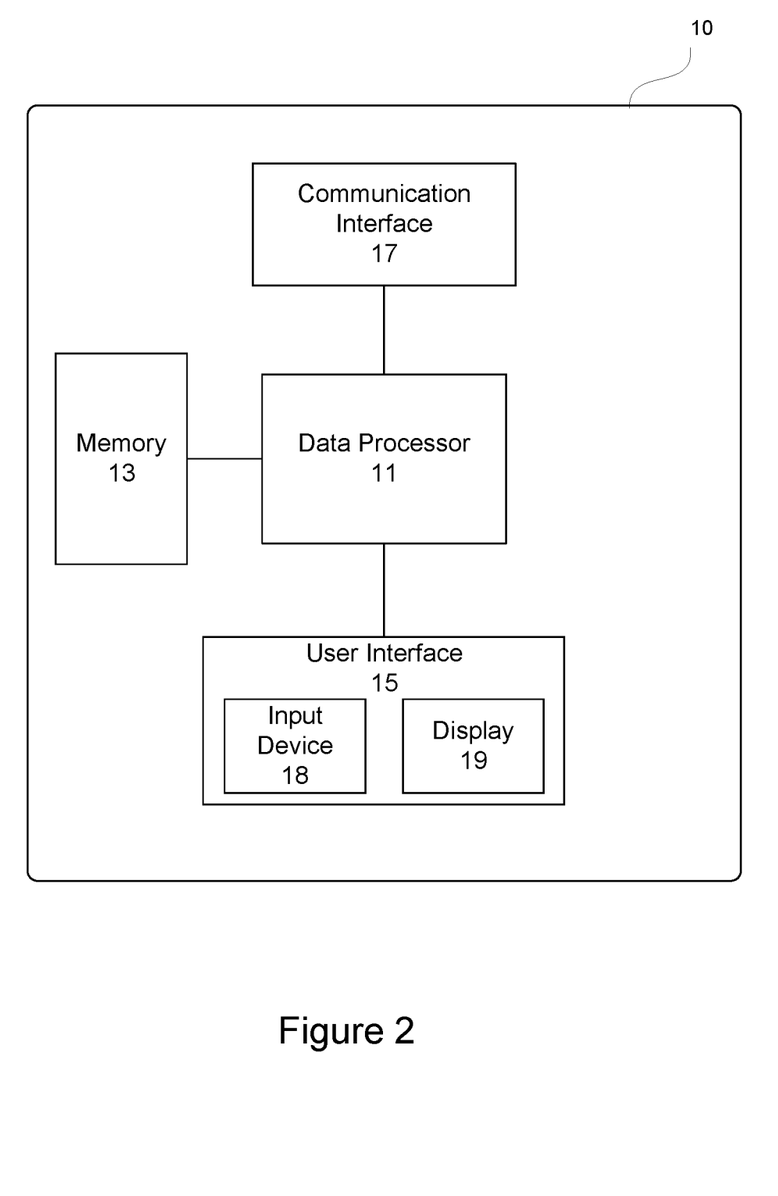
FIG. 2 is a schematic representation of a user processing device usable in conjunction with methods of the invention.

With reference to FIGS. 1 and 2, an account holder processing device 10 may be any data processing and/or communication device that an account holder uses to carry out a transaction and/or to communicate with the transaction processor 40 including, but not limited to a smartphone, a laptop, a desktop computer, and a tablet. In particular embodiments, the account holder device 10 includes an on-board data processor 11 in communication with a memory module 13, a user interface 15, and a communication interface 17. The data processor 11 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 13 can be a read-only memory, write-once read-multiple memory or read/write memory, e.g., RAM, ROM and EEPROM, and the user device 10 can include one or more of these memories.

The user interface 15 includes a user input device or mechanism 18, which can be any device for entering information and instructions into the account holder device 10, such as a touch-screen, keyboard, mouse, cursor-control device, microphone, stylus, or digital camera. The user interface 15 may also include a display 19, which can be any type of device for presenting visual information such as a computer monitor, a flat panel display, and a mobile device screen, including liquid crystal displays, light-emitting diode displays, plasma panels, and cathode ray tube displays.

The communication interface 15 is configured to establish and support wired or wireless data communication capability for connecting the device 10 to the network 30 or other communication network. The communication interface 15 can also be configured to support communication with a short-range wireless communication interface, such as near field communication, radio-frequency identification, and Bluetooth, through communication interface 215, along with radio transmissions.

In embodiments of the invention, the memory 13 may have stored therein one or more applications usable by the data processor 11 to conduct and/or monitor transactions between the account holder device 10 and a merchant device 20 or other device over the network 30. These applications may include instructions usable by the data processor 11 to identify transaction events, store event data in the memory 13, and communicate event data to the transaction processor 40 and/or the transaction monitoring system 100. Some applications may also include instructions relating to transaction information queries that can be transmitted to the transaction information search processor 130 and for structuring and displaying transaction information received from the enriched transaction database 120 via the transaction information search processor 130.

A merchant transaction processing device 20 may be any network enabled processor configured for processing a transaction with an account holder. As used herein, a merchant is any entity with which an account holder carries out a transaction. This may include without limitation any retailer, wholesaler, or bartering entity. A merchant may have one or more physical locations or may be an online retailer. The merchant transaction processing device 20 may be any network enabled device (e.g., cash register or other POS terminal or an on-line transaction server) capable of carrying out the transaction and communicating with the transaction processor 40.

The network 30 may be any form of communication network capable of enabling communication between the transaction entities and the transaction monitoring system 100. For example, the network 30 may be one or more of a wireless network, a wired network or any combination of wireless network and wired network. The network 30 may be or include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal. The network 30 may utilize one or more protocols of one or more network elements to which it is communicatively coupled. The network 30 may translate to or from other protocols to one or more protocols of network devices. Although the network 20 is depicted as a single network, it will be appreciated that it may comprise a plurality of interconnected networks, such as, for example, the Internet, a service provider's network, a cable television network, corporate networks, and home networks.

The transaction database 50 is a relational database configured for storage and retrieval of raw transaction information associated with a transaction between an account holder and a merchant. The raw transaction information may be received and stored in the transaction database 50 by the transaction processor 40. Information for a transaction may be provided by one or more of the account holder's processing device 10, the merchant's transaction processing device 20, and the transaction processor 40. The raw transaction information may include any of various aspects of the transaction including an account identifier associated with the account holder's account, a merchant identifier, the subject matter of the transaction (e.g., specific products and services), the date and time of the transaction, and an amount of payment. The transaction information may also include location information, such as geographical information associated with the physical location where the transaction was conducted. If the transaction is carried out using an account holder's processing device, the transaction data may include information sufficient to identify the device and/or the location of the device at the time of the transaction.

The transaction information processing server 110 is configured to receive raw information on individual transactions from the relational transaction database 50 and/or the transaction processor 40. In some embodiments, the transaction information processing server 110 may also receive raw transaction information directly from an account holder device 10 or merchant device 20. The transaction information processing server 110 is further configured to parse the raw transaction information and to identify the various characteristics of the transaction. For each characteristic, the transaction information processing server 110 may identify predetermined categories and sub-categories into which the transaction characteristic falls. Natural language terminology relating to the specific characteristic and/or to the related categories and sub-categories is then associated with the transaction. The transaction information processing server 110 may draw terminology and relationships from an enrichment facilitation database 140, the content of which may be informed by other systems and processes of the transaction monitoring entity and/or the transaction processing entity.

The transaction information processing server then establishes an enhanced transaction information record for the transaction in the enriched transaction database 120. The enriched transaction database 120 is an indexed database configured to facilitate searching on any characteristic of the transaction. In particular embodiments, the enriched transaction database 120 may be configured for clustered storage of enhanced transaction information records. In a particular example, the enriched transaction database 120 may be or include an Elasticsearch cluster. Each enhanced transaction information record includes the parsed transaction characteristics and the associated additional terminology.

The transaction information processing server 110 can be used to process existing transaction information records associated with an account to create enhanced transaction information records for the account. The transaction information processing server can then monitor activity on the account for new transactions. When a new transaction event occurs, the transaction information processing server 110 receives the raw transaction information, parses the transaction information, enhances the transaction information, and establishes an indexed enhanced transaction information record in the enriched transaction database 120.

The transaction information search processor 130 is configured for receiving requests for transaction information from the account holder devices 10. In some embodiments, the search processor 130 may also be configured for receiving information requests from the merchant devices 20. A transaction information request from an account holder device 10 will include information for identifying an account holder and/or an account associated with the device 10. The request will also include criteria for retrieving information from transactions associated with the account or account holder. The criteria may include predetermined ranges of certain transaction characteristics presented to the device user or ranges defined by the user. In particular embodiments, the criteria for information collection (i.e., aggregation) may be provided in the form of a natural language search.

It will be understood that the transaction information processor 130 may be configured to enact authorization or other security procedures before processing a transaction information request. Any security mechanism sufficient to assure that the account holder device 10 and/or the user are authorized to request transaction information for the account may be used.

The transaction information search processor 130 may comprise an application programming interface (API) configured for receiving the information request criteria and for converting and/or using the information request criteria to search the enriched transaction database 120 for all transaction records having information meeting the request criteria and for extracting such information. The API may, in particular, be configured to facilitate a user-defined search using natural language to identify the criteria for aggregating the requested transaction information. Upon retrieval from the enriched transaction database 120, the aggregated transaction information search processor 130 transmits the aggregated transaction information to the requesting account holder device 10.

Figure 3A:
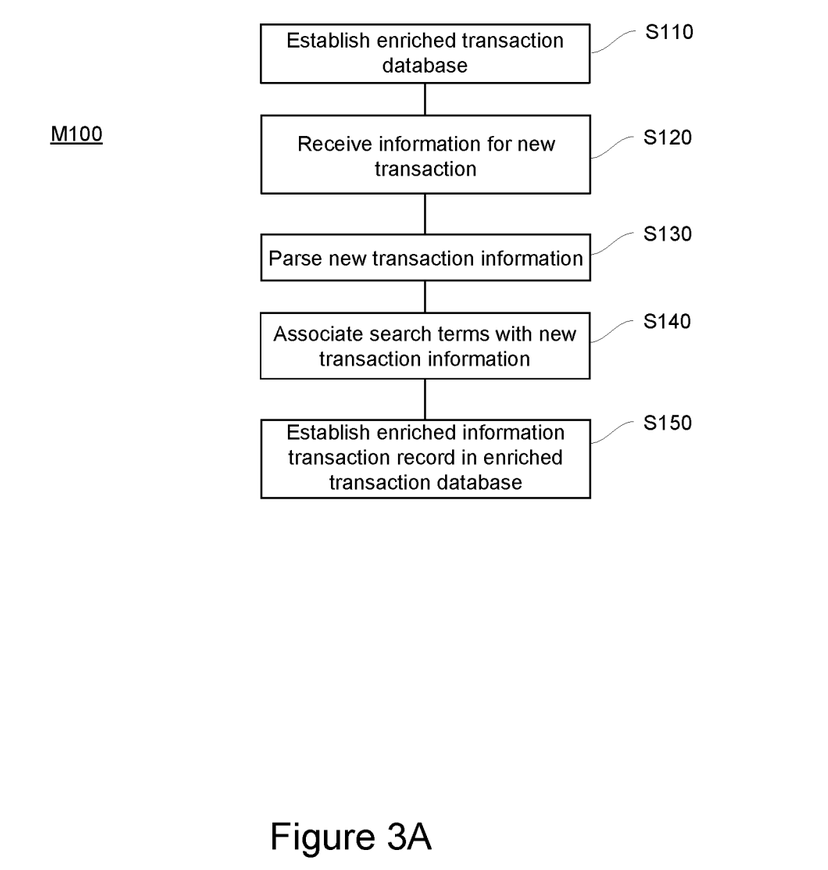
FIG. 3A is a block diagram of actions in a method of aggregating transaction information according to an embodiment of the invention.

FIG. 3A presents an illustrative method M100 of providing aggregated transaction information according to an embodiment of the invention that may be carried out using an automated system such as the system 100 of FIG. 1. The method M100 initially comprises at S110, the establishment of an enriched transaction database such as that previously disclosed in the system 100. For a particular account, this is accomplished by accessing the records in the distributed transaction database for all transactions associated with the account. The information for each such transaction is parsed by a transaction information processing server to identify the various characteristics of the transaction. For each characteristic of the transaction (e.g., merchant, location, product or service, or transaction type, date, time, etc.), the server identifies categories and sub-categories into which the transaction characteristic falls. The server then associates each characteristic with natural language terminology relating to the specific characteristic and/or to the related categories and sub-categories. This action may include drawing terminology and relationships from an enrichment facilitation database. An enriched transaction record is then established for each transaction. This record comprises the basic transaction information and the associated terminology enhancements. The enriched transaction records for all transactions associated with the account are individually indexed and stored in a searchable database cluster configured to facilitate searching on any characteristic of the transaction. In a particular embodiment, this may be or include an Elasticsearch cluster.

Once the enriched transaction database has been established, information for new transactions may be added on a periodic basis or as they occur in real-time or near real time. In each case, raw transaction information is received by a transaction information processing server at S120. The raw transaction information may be received from a transaction database, from a transaction processor, or directly from an account holder or merchant. At S130, the raw transaction information is parsed by the transaction information server to identify and categorize its characteristics. At S140, the characteristics of the new transaction are used by the server to identify additional natural language terminology, which are then associated with the transaction. At S150, the transaction information processing server establishes and indexes an enhanced transaction information record for the transaction in the enriched transaction database 120.

Figure 3B:
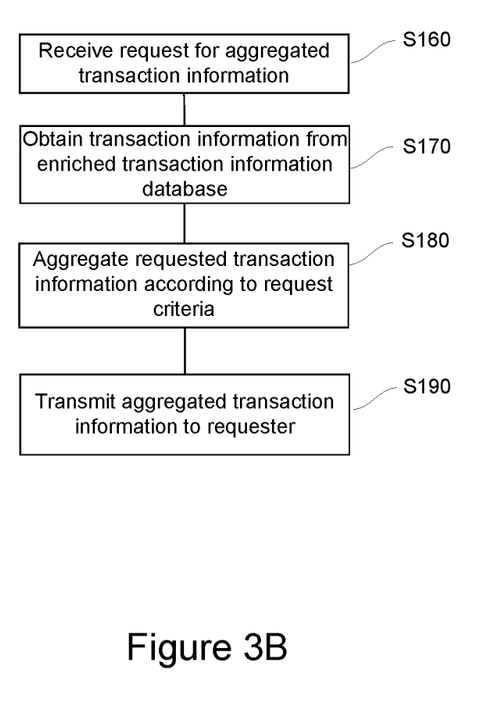
FIG. 3B is a block diagram of actions usable in conjunction with the actions shown in FIG. 3A.

The enriched transaction database provides the basis for responding to requests by a user (typically, but not necessarily, the account holder) for information relating to an account. Such requests may include user-established criteria for identifying and aggregating transaction activity information. As shown in FIG. 3B, the method M100 may be extended to include actions associated with providing information in response to such a user request. At S160, a user request for aggregated transaction information is received by a transaction information search processor. The user request is received over a network from a user device associated with an account. The user device may be, for example, a mobile interface device or other processor of the account holder. In some embodiments, the user device may be a processor of a merchant, transaction processor, or other issuer of the account. The user request includes information for identifying the account and/or the account holder. The request may also include information needed for verification of the user's authorization to obtain the requested information. The user request further includes criteria for searching and assembling transaction information associated with the account. The search criteria provide the basis for identifying the transaction records from which information is to be extracted. More specifically, the criteria allow the processor to identify and break down the transaction information based on the previously determined categories and sub-categories to which transaction characteristics have been assigned.

By way of example, a user request may include a request for a summary of money paid to a particular merchant over a particular six month period using the account. The transaction characteristics identified in the request criteria would simply be the transaction value, the merchant and the date. In another example, the criteria could be directed to a characteristic such as product type (e.g., sporting goods) that cuts across multiple merchants. The search criteria in the user request may be or be based on criteria presented to the user as one of a set preset options. The methods of the invention, however, are particularly adapted for user-defined search criteria. In particular, according to embodiments of the invention, the user request may include search criteria in the form of a natural language request search query.

At S170, the transaction information search server uses the search criteria to obtain transaction information meeting the criteria from the enriched transaction database. In particular embodiments, an application programming interface (API) may be used to search the enriched transaction database for all transaction records having information meeting the request criteria and for extracting such information. The API may, in particular, be configured to facilitate a user-defined search using natural language to identify the criteria for aggregating the requested transaction information. At S180, the specific transaction characteristics identified in the search criteria may be further aggregated according to additional criteria specified in the request. For example, once the information for all transactions meeting the search criteria has been extracted, it may be summed, sorted, or broken down based on additional criteria. At S190, aggregated transaction information is transmitted to the requesting user device.

Figure 4:
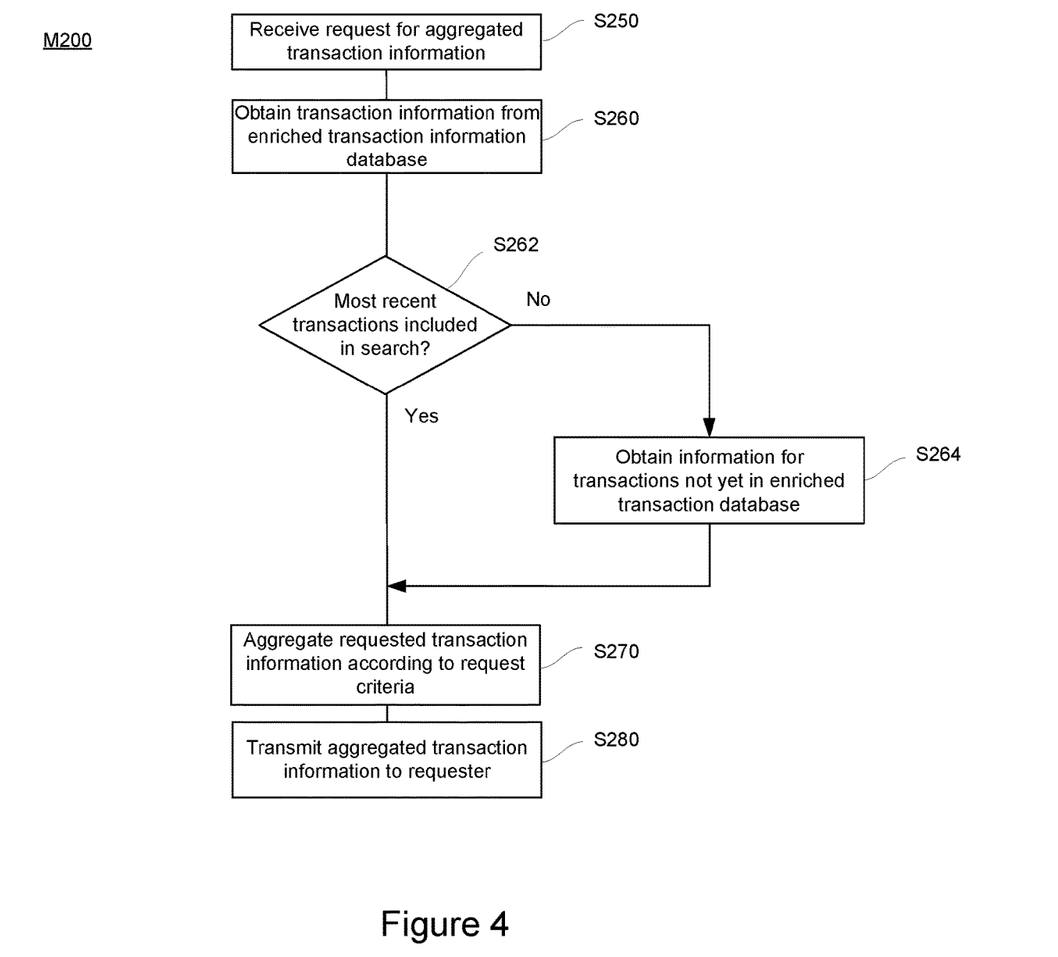
FIG. 4 is a block diagram of actions in a method of aggregating transaction information according to an embodiment of the invention.

In some instances, the transaction information available from the enriched transaction database may not include records for the most recent transactions or such records may be in the database, but are not yet available for searching. In such cases, information for these transactions might not be included in the aggregated transaction information provided in response to a user request. FIG. 4 illustrates actions of a method M200 of providing aggregated transaction information according to an embodiment of the invention in which additional action is taken to assure that all transactions are included in the aggregated information provided in response to a user request. The method M200 makes use of an enriched transaction database established as in previous embodiments. At S250 of the method M200, a user request for aggregated transaction information is received by a transaction information search processor as before. The user request is received over a network from a user device associated with an account and includes information for identifying the account and/or the account holder. The request may also include information needed for verification of the user's authorization to obtain the requested information. The user request further includes criteria for searching and assembling transaction information associated with the account. The search criteria provide the basis for identifying the transaction records from which information is to be extracted. At S260, the transaction information search server uses the search criteria to obtain transaction information meeting the criteria from the enriched transaction database. At S262, the transaction information search processor may determine whether any recent transactions were not included in the searchable records of the enriched transaction information database. If any transactions were not included, the transaction information search processor reviews these transactions and obtains information for any that meet the search criteria at S264. At S270, the information for all transactions having characteristics meeting the search criteria are aggregated. At S280, aggregated transaction information is transmitted to the requesting user device.

Figure 5:
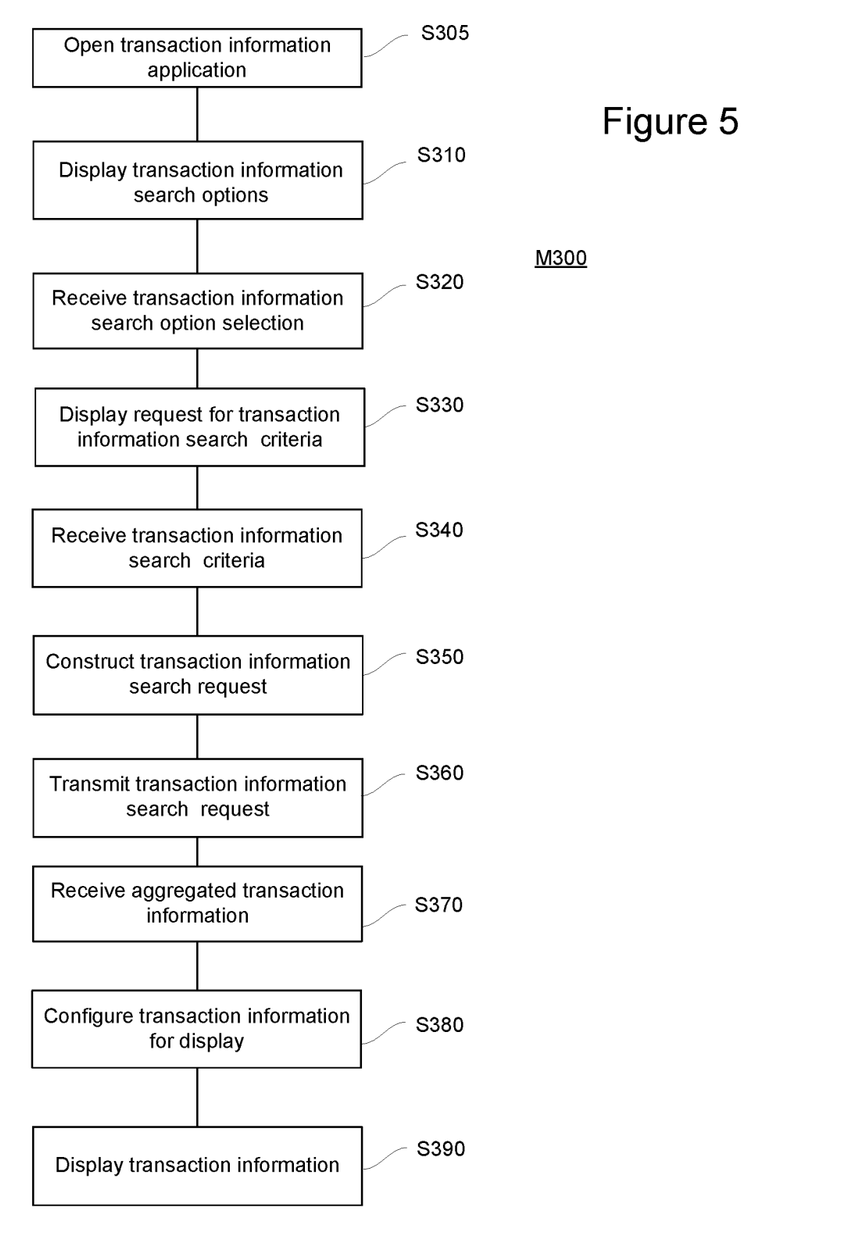
FIG. 5 is a block diagram of actions in a method of providing aggregated transaction information according to an embodiment of the invention.

With reference to FIG. 5 a method M300 of providing transaction information to a user on a user device includes opening a transaction information application on the user device at S305. This action may include identifying a particular account and/or verifying that the user is authorized to obtain information for the account. At S310, the application displays a series of options to the user. These options may include a series of predetermined search queries structured based on typical transaction characteristics and time intervals for which a user may wish to obtain information. They may also include the additional option of the user formulating a natural language search query. At S320, the user device processor receives a search option selection via a user interface of the device. At S330, the application displays a request for the user to enter transaction information search criteria. For standard searches, this may simply require that the user enter values for certain characteristics (e.g., a time interval and the name of a merchant). If the user selected the natural language search option, the user is prompted to enter a user-constructed query. At S340, the device processor receives the search criteria via the user interface, and, at S350 uses it to construct a transaction information search request. The search request includes transaction search and aggregation criteria along with information sufficient to identify the account. The search request may also include information sufficient to verify authorization to obtain information for the account. At S360, the transaction information search request is transmitted by the user device over a network to a transaction information search processor associated with the account. At S370, aggregated transaction information responsive to the search criteria is received by the user device over a network from a transaction information search processor or, in some cases, directly from a transaction database. At S380, the transaction information is configured by the user device processor for display. This may include constructing a particular graphic presentation of the information such as a pie chart, bar graph, heat map, etc. In some embodiments, particular display options may be presented to the user and graphics constructed according to the user's selection. The action of configuring the transaction information may also include additional processing or subdividing of the information according to additional criteria specified by the user. At S390, the user device processor displays the transaction information to the user via the device display.

The present invention provides significant improvements in systems and methods for providing information to account holders about transactions associated with their accounts. Specifically, the present invention provides systems configured to store information in a way that allows account holders and other users to access transaction information according to user-specified criteria, rather than criteria pre-specified by a transaction processing or monitoring entity.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An automated transaction information aggregation system comprising:
    an enriched transaction database comprising an indexed transaction record for each of a plurality of transactions, the indexed transaction record including an account holder identifier, at least one transaction parameter, and a plurality of search terms associated with each of the at least one transaction parameter, the enriched transaction database being configured for clustered storage of said indexed transaction records based on the at least one transaction parameter;
    a network-enabled transaction information data processing device configured to receive raw transaction information for a new transaction from at least one of the set consisting of a merchant device and an account holder device, the raw transaction information for the new transaction including a new transaction account holder identifier and at least one transaction parameter having a parameter characteristic, determine and categorize the parameter characteristic for each transaction parameter for the new transaction into a plurality of categories and sub-categories using the raw transaction information, identify natural language terminology based on one or more relationships between each parameter characteristic as well as the plurality of categories and sub-categories, associate the identified natural language terminology with the new transaction, and establish a new indexed transaction record in the enriched transaction database for the new transaction, the new indexed transaction record including the new transaction account holder identifier, each of the at least one transaction parameters and parameter characteristics, and the associated identified natural language terminology.

2. An automated transaction information aggregation system according to claim 1 wherein the at least one transaction parameter includes at least one of the set consisting of a vendor identifier, a transaction time, a transaction date, a transaction location, a transaction value amount, and a goods or services type.

3. An automated transaction information aggregation system according to claim 1 further comprising:

an enrichment facilitation database comprising searchable terms associated with potential transaction parameter characteristics, wherein the transaction information data processing device is in data communication with the enrichment facilitation database and is configured to, as part of the action to associate search terms, obtain searchable terms from the enrichment facilitation database using the parameter characteristic of each said at least one transaction parameter.

4. An automated transaction information aggregation system according to claim 1 further comprising:

a network-enabled query data processing device in data communication with the enriched transaction database and in selective data communication over a network with an account holder data processing device associated with an account holder identifier, the query data processing device being configured to receive a request for aggregated transaction information from the account holder data processing device, the request including aggregation criteria, obtain aggregated transaction information meeting the aggregation criteria from the enriched transaction database, and transmit the aggregated transaction information to the account holder data processing device.

5. An automated transaction information aggregation system according to claim 4 wherein the aggregation criteria include a limitation of the transaction information to at least one of the set consisting of transactions occurring within a particular time interval,
transactions involving a particular vendor,
transactions processed by a particular transaction processor;
transactions occurring in a certain location,
transactions occurring within a predefined area,
transactions having a value with a particular value range, and
transactions involving a certain type of goods or services.

6. An automated transaction information aggregation system according to claim 4 wherein the request for aggregated transaction information includes a natural language search query.

7. An automated transaction information aggregation system according to claim 4 wherein the aggregated transaction information transmitted to the account holder data processing device is provided in a form that is usable by an application on the account holder data processing device to display the aggregated transaction information in a predefined manner.

8. An automated method of providing aggregated transaction information to an account holder, the method comprising:

establishing an enriched transaction database comprising an indexed transaction record for each of a plurality of transactions associated with an account of the account holder, the indexed transaction record including at least one transaction parameter having a plurality of search terms associated therewith, the enriched transaction database being configured for clustered storage of said indexed transaction records based on the at least one transaction parameter;

receiving, from one of the set consisting of a merchant device and an account holder device associated with the account, raw transaction information for a new transaction, the raw transaction information including at least one transaction parameter for the new transaction;

determining by a first automated data processing system from the raw transaction information, a parameter characteristic for each of the at least one transaction parameter for the new transaction;

categorizing, by the first automated data processing system, each parameter characteristic into a plurality of categories and sub-categories;

identifying, by the first automated data processing system, natural language terminology based on one or more relationships between each parameter characteristic as well as the plurality of categories and sub-categories;

associating, by the first automated data processing system, the identified natural language terminology with the new transaction;

establishing, by the first automated data processing system, a new indexed transaction record in the enriched transaction database for the new transaction, the new indexed transaction record including the new transaction account holder identifier, each of the at least one transaction parameters and parameter characteristics, and the associated identified natural language terminology;

receiving, by a second automated data processing system, a request for aggregated transaction information from the account holder user device, the request including aggregation criteria;

obtaining, by the second automated data processing system, aggregated transaction information meeting the aggregation criteria from the enriched transaction database; and transmitting, by the second automated data processing system, the aggregated transaction information to the user device.

9. An automated method according to claim 8 wherein the at least one transaction parameter includes at least one of the set consisting of a vendor identifier, a transaction time, a transaction date, a transaction location, a transaction value amount, and a goods or services type.

10. An automated method according to claim 8 wherein the action of associating search terms includes obtaining search terms from an enrichment facilitation database comprising searchable terms associated with potential transaction parameter characteristics.

11. An automated method according to claim 8 wherein the aggregation criteria include a limitation of the transaction information to at least one of the set consisting of
- transactions occurring within a particular time interval,
- transactions involving a particular vendor,
- transactions processed by a particular transaction processor;
- transactions occurring in a certain location,
- transactions occurring within a predefined area,
- transactions having a value with a particular value range, and
- transactions involving a certain type of goods or services.

12. An automated method according to claim 8 wherein the request for aggregated transaction information includes a natural language search query.

13. An automated method according to claim 12 further comprising:

parsing, by the second automated data processing system, the natural language search query to determine the aggregation criteria.

14. An automated method according to claim 8 wherein the aggregated transaction information transmitted to the account holder device is provided in a form that is usable by an application on the account holder device to display the aggregated transaction information in a predefined manner.

15. An automated method according to claim 8 further comprising:

requesting, from at least one of the set consisting of a transaction processor, a raw transaction database, and the user device, additional transaction information associated with transactions occurring since transaction information was last received by the first automated data processing system; and receiving, from said at least one, said additional transaction information.

16. An automated method according to claim 15 further comprising aggregating information in the additional transaction information meeting the aggregation criteria with the aggregated transaction information from the enriched transaction database meeting the aggregation criteria.

\* \* \* \* \*